(12) United States Patent
Lofthus et al.

(10) Patent No.: US 7,206,532 B2
(45) Date of Patent: Apr. 17, 2007

(54) MULTIPLE OBJECT SOURCES CONTROLLED AND/OR SELECTED BASED ON A COMMON SENSOR

(75) Inventors: Robert M. Lofthus, Webster, NY (US); Kristine A. German, Webster, NY (US)

(73) Assignee: Xerox Corporation, Stamford, CT (US)

( * ) Notice: Subject to any disclaimer, the term of this patent is extended or adjusted under 35 U.S.C. 154(b) by 200 days.

(21) Appl. No.: 10/917,676

(22) Filed: Aug. 13, 2004

(65) Prior Publication Data

US 2006/0034631 A1    Feb. 16, 2006

(51) Int. Cl.
*G03G 15/00* (2006.01)
*G03G 15/01* (2006.01)

(52) U.S. Cl. .............................. 399/84; 399/40; 399/41; 399/371; 399/372

(58) Field of Classification Search .................... 399/9, 399/15, 39, 49, 46, 60, 72, 84, 40, 41, 371, 399/372
See application file for complete search history.

(56) References Cited

U.S. PATENT DOCUMENTS

| | | | |
|---|---|---|---|
| 4,579,446 A | 4/1986 | Fujino et al. |
| 4,586,812 A | 5/1986 | Kaneko et al. |
| 4,587,532 A | 5/1986 | Asano |
| 4,591,884 A | 5/1986 | Miyamoto et al. |
| 4,836,119 A | 6/1989 | Siraco et al. |
| 4,972,236 A | 11/1990 | Hasegawa |
| 5,004,222 A | 4/1991 | Dobashi |
| 5,080,340 A | 1/1992 | Hacknauer et al. |
| 5,095,342 A | 3/1992 | Farrell et al. |
| 5,150,167 A | 9/1992 | Gonda et al. |
| 5,159,395 A | 10/1992 | Farrell et al. |
| 5,208,640 A | 5/1993 | Horie et al. |
| 5,272,511 A | 12/1993 | Conrad et al. |
| 5,287,162 A | 2/1994 | de Jong et al. |
| 5,326,093 A | 7/1994 | Sollitt |
| 5,435,544 A | 7/1995 | Mandel |

(Continued)

FOREIGN PATENT DOCUMENTS

WO    WO 97/28640 A    8/1997

OTHER PUBLICATIONS

**Today at Xerox No. 1129 Aug. 13, 2001, Clustering Printing Solution Announced.

(Continued)

*Primary Examiner*—Hoang Ngo
(74) *Attorney, Agent, or Firm*—Eugene O. Palazzo; Fay Sharpe LLP (57) ABSTRACT

A sensor module is able to sense at least one aspect of objects produced by a plurality of object sources. Since one sensor module or set of sensor elements is used to examine output from the plurality of object sources, sensor to sensor variation is removed as a source of error. In a multi-engine document processor, information from the sensor module is used to adjust process actuators, adjust image data and/or generate scheduling constraints to improve output consistency. For example, facing pages of a document are rendered only on marking engines operating within a predetermined tolerance of one another. Image data may be altered so that related images are within the measured capabilities of a plurality of marking engines. System actuators, such as xerographic actuators, of selected marking engines are adjusted to improve output consistency between marking engines.

23 Claims, 5 Drawing Sheets

U.S. PATENT DOCUMENTS

| | | | |
|---|---|---|---|
| 5,443,254 A | 8/1995 | Reist | |
| 5,467,710 A | 11/1995 | Wirz | |
| 5,473,419 A | 12/1995 | Russel et al. | |
| 5,479,856 A | 1/1996 | Wirz | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,574,527 A | 11/1996 | Folkins | |
| 5,596,416 A | 1/1997 | Barry et al. | |
| 5,598,257 A | 1/1997 | Keller et al. | |
| 5,629,762 A | 5/1997 | Mahoney et al. | |
| 5,655,208 A | 8/1997 | Sahay et al. | |
| 5,710,968 A | 1/1998 | Clark et al. | |
| 5,730,535 A | 3/1998 | Keller et al. | |
| 5,742,867 A | 4/1998 | Kodama et al. | |
| 5,748,221 A | 5/1998 | Castelli et al. | |
| 5,752,776 A | 5/1998 | Kunreuther | |
| 5,778,377 A | 7/1998 | Marlin et al. | |
| 5,839,016 A | 11/1998 | Folkins et al. | |
| 5,859,711 A | 1/1999 | Barry et al. | |
| 5,884,910 A | 3/1999 | Mandel | |
| 5,940,186 A | 8/1999 | Barry et al. | |
| 5,963,770 A | 10/1999 | Eakin | |
| 5,995,721 A | 11/1999 | Rourke et al. | |
| 6,035,103 A * | 3/2000 | Zuber | 358/1.9 |
| 6,059,284 A | 5/2000 | Wolf et al. | |
| 6,125,248 A | 9/2000 | Moser | |
| 6,157,735 A | 12/2000 | Holub | |
| 6,212,357 B1 | 4/2001 | Boehmer et al. | |
| 6,241,242 B1 | 6/2001 | Munro | |
| 6,269,237 B1 | 7/2001 | Olbrich et al. | |
| 6,297,886 B1 | 10/2001 | Cornell | |
| 6,317,581 B1 | 11/2001 | Boehmer et al. | |
| 6,337,958 B1 | 1/2002 | Stanich et al. | |
| 6,341,773 B1 | 1/2002 | Aprato et al. | |
| 6,344,902 B1 | 2/2002 | Duke et al. | |
| 6,384,918 B1 | 5/2002 | Hubble, III et al. | |
| 6,450,711 B1 | 9/2002 | Conrow | |
| 6,456,310 B1 | 9/2002 | Wallace et al. | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,501,929 B1 | 12/2002 | Warbus et al. | |
| 6,537,910 B1 | 3/2003 | Burke et al. | |
| 6,550,762 B2 | 4/2003 | Stoll | |
| 6,550,764 B2 | 4/2003 | Wilson et al. | |
| 6,554,276 B2 | 4/2003 | Jackson et al. | |
| 6,567,621 B2 | 5/2003 | Miyoshi et al. | |
| 6,577,925 B1 | 6/2003 | Fromherz | |
| 6,606,165 B1 | 8/2003 | Barry et al. | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,675,957 B2 | 1/2004 | Greive et al. | |
| 6,697,582 B1 | 2/2004 | Scheuer | |
| 6,714,834 B1 | 3/2004 | Roth et al. | |
| 2002/0015177 A1 | 2/2002 | Yamakado et al. | |
| 2002/0078012 A1 | 6/2002 | Ryan et al. | |
| 2002/0103559 A1 | 8/2002 | Garstein | |
| 2003/0007154 A1 | 1/2003 | Tandon et al. | |
| 2003/0063275 A1 | 4/2003 | Hubble, III et al. | |
| 2003/0077095 A1 | 4/2003 | Conrow | |
| 2003/0095722 A1 | 5/2003 | Regimbal | |
| 2003/0128993 A1 | 7/2003 | Mitsuya et al. | |
| 2003/0133731 A1 | 7/2003 | Nakazawa et al. | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0257596 A1 | 12/2004 | Mestha et al. | |

OTHER PUBLICATIONS

Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
Partial European Search Report EP 05107452, 2 sheets.
European Search Report.

* cited by examiner

MULTIPLE OBJECT SOURCES CONTROLLED AND/OR SELECTED BASED ON A COMMON SENSOR

BACKGROUND

The present exemplary embodiments relate to systems wherein objects are presented, delivered or produced by a plurality of sources and wherein one or more aspects of the presentation, delivery or production of the objects is monitored, measured and/or controlled based on information from a sensor module that is accessible by objects presented, delivered or produced by each of the plurality of object sources. Embodiments will be described in detail in regard to tightly integrated document processing systems. However, embodiments in other object handling or producing systems are also contemplated.

Broadly, document processing systems include input devices, transportation systems and output devices. For example, input devices can include paper trays or drawers. Transportation systems can include conveying devices such as driven nips (spherical or cylindrical), conveyer belts, air jets or vacuums and other mechanisms. Finishing devices can include output trays, staplers, binders, shrink wrappers and bundlers. In the case of printers and copiers, document processors include print engines or integrated marking engines (IMEs).

In copiers and printers, sheets or webs, such as paper or velum are transported by an interposer, or an interposer system, from paper trays or drawers to a print engine or IME. The IME receives data directing the IME to place marks on the delivered sheet. The IME places the marks (e.g., text or an image) on the sheet and the interposer carries the sheet away for further processing or delivery. The interposer may include a reverser for flipping the sheet to present an opposite side for marking. Additionally, or alternatively the interposer may deliver the sheet to an output device, such as an output tray or a finisher.

Some document processors include a plurality of integrated marking engines. Each integrated marking engine (IME) includes sensors and control loops for maintaining or directing one or more IME processes at or toward some ideal or target. For instance, some electro-photographic systems include a hierarchical control scheme. An exemplary electro-photographic system includes level one control loops for maintaining electro-photographic actuators at set points, level two control loops for selecting set points for the level one control loops and level three controls for compensating for residual differences between actual and target values of aspects of the electro-photographic process.

In the case of xerographic systems available actuators can include cleaning field strength or voltage, development field strength or voltage, imager or laser power and an AC wire voltage associated with some developers. For instance, in some xerographic environments, level one control loops include electrostatic volt meters (ESV) for measuring charge voltage generated by charge applied to a photoconductive member. The ESV measure the charge applied in an area of test patches in interdocument or interpage zones (IPZ) of the photo conductor. If measured voltages, such as, for example, a discharge area voltage or a cleaning voltage deviate from set point values, level one control loops adjust these xerographic actuators to return the measured voltage to set point. For example, a charge or bias voltage applied to elements of a developer is adjusted to control a resulting development and/or cleaning field. Additionally, or alternatively, a level one control loop may adjust a laser power to return a related discharge field back toward a discharge field set point.

Level two control loops can include, for example, infrared densitometers (IRD) or enhanced toner area coverage sensors (ETACS) that can measure the density of toner or colorant applied to or developed on a photo conductive member. If the amount of colorant or toner in a test patch is incorrect or varies from a target density, level two control loops generate or select one or more new set points for the actuators of the level one control loops.

Level three control loops may also use IRD or ETACS sensors. The IRD or ETACS sensors sense actual densities of level three test patches associated with a plurality of target level three test patch densities. This provides level three controllers with information about actual tone reproduction curves (TRC) and, therefore, with information about residual error between the actual tone reproduction curve and target tone reproduction curves that could not be addressed by the level two control loops. The level three controls use this information to build color correction look up tables which are used in an image path to alter image data to compensate for the residual error.

Controls such as these can provide excellent quality and consistency within the production of an individual object source. However, differences in sensors, toners or colorants, temperatures, humidities and other parameters and aspects of object sources can lead to variations between objects produced by a first object source and objects produced by a second object source. Variations between the outputs of two or more object sources can be completely acceptable where entire production runs are produced by a single object source. However, when component parts of a single product are produced by different object sources, object source to object source variations can be problematic.

For example, where a document processor includes two or more integrated marking engines, marking engine to marking engine variations can be perceived as consistency or quality issues. For instance, where facing pages in a booklet are rendered by different print engines, slight variations in registration, gray scale or color between the facing pages can be perceived as a defect, even though when considered separately, the pages would be considered to be of high quality.

To combat this perceived quality issue, efforts have been directed toward eliminating IME to IME variations by implementing evermore sophisticated sensors and control algorithms within individual IMEs. However, these solutions are expensive in both research and development costs and hardware implementations delivered to customers. Even where these additional measures are taken, the goal of perfectly matched integrated marking or print engines remains elusive.

Therefore, there is a desire for systems and methods that reduce or eliminate perceived defects due to slight variations in object sources in multi-object source systems.

BRIEF DESCRIPTION

A system for handling objects includes a first object source operative to present objects, a second object source operative to present objects, a first object delivery path operative to transport objects presented by the first object source to a first destination, a second object delivery path operative to transport objects presented by the second object source to a second destination, wherein the first and second destinations may be a single destination, separate destinations or interchangeable destinations, a sensor module or sensor element which is accessible from the both first object delivery path and the second object delivery path and a controller. The first and second object delivery paths may include common portions. The sensor module is operative to sense at least one aspect of a delivered object. The controller is operative to receive information from the sensor module regarding the sensed at least one aspect of the object delivered to the at least one sensor module and thereby, monitor and if appropriate, adjust or compensate for at least one aspect of the first and second object sources.

In some embodiments the system is a document processor. One or both of the object sources can be marking engines or rendering devices. An interposer, or system of sheet transportation paths, routes or transports sheets presented by the marking engines or rendering devices to output devices or to the sensor module. The sensor module includes one or more sensor elements.

A plurality of sensor elements may be included in a single sensor module enclosure or zone or housed or mounted separately. The phrase -sensor module- is used herein to refer to a collection of one or more sensor elements whether they are co-located or mounted separately, as long as output from any object source or marking engine in the system can be transported to any sensor element and only one particular sensor element is used to sense any particular kind of aspect. A system may include additional sensors that do not meet these criteria. However, such sensors are not included in references to a -sensor module- or -sensor element- made herein.

In some document processing embodiments the controller can adjust document process actuators to correct errors reported by the sensor module. Additionally, or alternatively, video or image path data can be adjusted or altered to compensate for some facet or aspect of performance of one or more marking engines. Some embodiments provide for constraining a scheduler, based on measurements from the sensor module, so that critical portions of a document processing job are rendered only on those marking engines that can render the critical portions within some specified tolerance or accuracy.

Since one sensor module, or set of sensing elements, is used to measure or test output from a plurality of marking engines, sensor to sensor variability is removed as a source of error when comparing the output of the plurality of marking engines. Therefore, consistency of system output is improved.

DETAILED DESCRIPTION OF PREFERRED EMBODIMENTS

Figure 1:
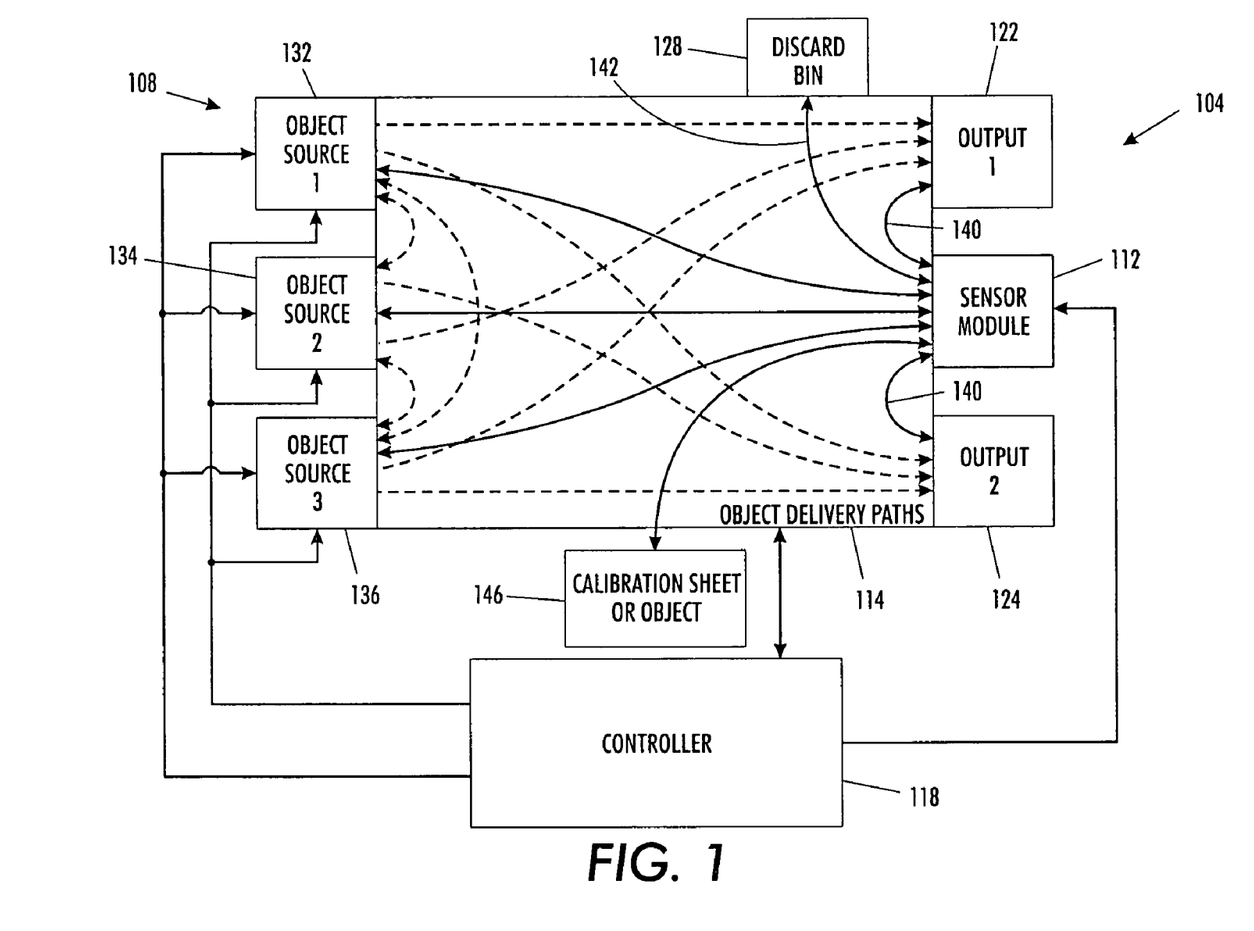
FIG. 1 is a block diagram of a multi-object source system including a sensor module and a plurality of object delivery paths whereby objects produced, generated, presented or delivered by each of the plurality of object sources may access the sensor module.

Referring to FIG. 1, a system 104 for handling objects includes a plurality 108 of object sources, a sensor module 112, or set of sensing elements, and a plurality of object delivery paths 114. A controller 118 is operative to orchestrate or control sensing or diagnostic sessions. The system 104 may include main outputs, such as a first output 122 and a second output 124. A third output, may be designated as a discard bin 128.

In the exemplary system 104, the plurality of object sources includes a first object source 132, a second object source 134 and a third object source 136. The object sources 108 can be any object sources wherein one or more aspects of objects delivered by the object sources 108 are beneficially sensed on an occasional or periodic basis in order to establish, adjust, react to or compensate for aspects of the object delivery, production, generation, presentment or handling process of the system 104.

For example, where the exemplary system 104 is a document processor, the plurality of object sources 108 may include document sources such as trays of preprinted sheets, input paper trays and/or rendering devices or integrated marking engines. For instance, where the first object source 132 is a preprinted form supply bin or tray and the second object source 134 is an integrated marking engine, an exemplary preprinted form may be carried from the first object source 132 to the sensor module 112 via an object delivery path 114. The sensor module 112 may determine a color gamut associated with the preprinted forms supplied by the first object source 132. Additionally, or alternatively, the sensor module may determine registration information associated with the preprinted document. This information may be used to adjust or control some aspect of the second object source 134.

For instance, if the second object source 134 is to print an opposing page in an assembly, adjustments may be made so that rendered pages from the second object source 134 match the colors or shading in the preprinted pages.

Alternatively, preprinted pages from the first object source 132 might be delivered to the second object source 134 so that the second object source 134 might provide additional markings to the preprinted forms. In that case, registration information provided by the sensor module 112 can be used to better register, align or place the marks provided by the second object source 134.

Sample or diagnostic sheets generated or provided by the second object source 134 may also be transported by the object delivery paths 114 to the sensor module 112, where they may be sampled, sensed, examined or studied to provide information for fine tuning registration and/or color matching or shading aspects of the marking process of the second object source 134.

Where the plurality of object sources 108 includes a plurality of marking engines, the sensor module 112 may be used to insure that output from each of the marking engines is consistent or compatible with output from one or more of the other marking engines. Additionally, or alternatively, information from the sensor module 112 may be used to select one or more of the plurality of object sources 108 for processing, generating or producing particular portions of a document processing job.

For instance, as will be explained in greater detail below, at the beginning of a document processing job, at the command of a user or system operator, and/or at regular intervals (e.g., measured in time or production units), the controller directs the first, second and third object sources to generate diagnostic sheets and directs the object delivery paths 114 to transport the diagnostic sheets (e.g., sequentially) to the sensor module 112. The sensor module 112, or set of sensor elements, may determine aspects or characteristics of the production of marks on sheets from each of the object sources (132, 134, 136). For example, current color gamuts and registration information may be collected for each of the object sources (132, 134, 136). The controller 118 may compare job description information with the color gamut information provided by the sensor module 112. Portions of the document processing job calling for marks at an extreme portion of a color gamut may be directed for processing to a selected one of the plurality of object sources (132, 134, 136) that the sensor module 112 reports is currently able to produce colors in that range. Alternatively, the controller 118 may determine an intersection of color gamuts between all of the object sources 132, 134, 136 and alter job description data (e.g., compress the gamut requirement of the job description) so that production of any portion of the job is within the capabilities of any of the object sources (132, 134, 136). These processes and others will be described in greater detail with reference to FIG. 4.

Color gamut information can include color calibration information. Therefore, information from the sensor module 112 may be used to adjust, compensate or apply calibration information to image data to customize or calibrate the image data for rendering or printing by a selected one of the object sources (132, 134, 136). For instance an actual tone reproduction curve or engine response curve may be determined or measured by the sensor module 112 for a target or selected one of the object sources. The actual tone reproduction curve is compared to an ideal, desired or target tone reproduction curve and a compensating or calibrating tone reproduction curve is generated. The compensating or calibrating tone reproduction curve is applied to image data so that the desired colors of the image data are rendered by the selected or target rendering device.

As mentioned above, the exemplary system 104 can include one or more main outputs (122, 124). The main outputs 122, 124 may provide additional processing or may simply be output collecting bins or trays. For instance, where the exemplary system 104 is a document processor the output devices 122, 124 may provide finishing services, printing services, or output collection services. For example, the first output 122 may be a stapler, binder or shrink wrapping device. The second output 124 might be a simpler document or sheet collection tray or collator.

In some embodiments, sheets directed to the sensor module 112 may be regular object source production or delivery items. As such, sensed objects might be properly directed to an output device (e.g., 122, 124) when the sensor module 112 is finished examining, sensing or studying them. In such embodiments, paths 140 are provided for directing objects from the sensor module 112 to one or more output devices (e.g., 122, 124). In embodiments where sensed objects are special or diagnostic in nature, it may be inappropriate to direct sensed objects to output devices intended for normal or main production items. In such embodiments, after the sensor module 112 examines, studies, samples or senses a diagnostic object, the diagnostic object may be directed along a discard path 142 to the discard bin 128. For example, in a document processor, the discard bin 128 might be a purge tray to which sample jobs, diagnostic sheets and other non-main job items may be directed.

Systems such as exemplary system 104 that include a sensor module (e.g., 112), or a set of sensing elements (co-located or mounted separately), for examining, studying, sampling or sensing aspects of objects produced or provided by a plurality of object sources (e.g., 108) have an advantage over systems that only provide dedicated sensors for each individual object source. In systems with sensors that are dedicated to only individual object sources, the sensors themselves may become a source of error with regard to object source to object source variation. For instance, if each object source in a plurality of object sources included a dedicated color sensor and there were no sensor module (e.g., 112), or set of sensing elements, common to the plurality of object sources, then a color sensor that drifts over time and becomes more sensitive to, for example, red, may report that the print engine associated with the drifting sensor includes a color gamut that extends further into the red than the dedicated color sensors associated with the other object sources report with regard to their associated print engines. This misinformation might cause a controller to misdirect a red portion of a document printing job to the object source associated with the drifting sensor reporting a redder gamut. Since such qualitative decisions in the exemplary system 104 are based on a sensor module 112, or set of sensing elements, that is, in effect, common to all the object sources (e.g., 132, 134, 136), even if the sensor module 122 includes drifting sensing elements, the relative or qualitative relationship between the object sources will still be reported correctly. That is, for example, the object source having a gamut extending furthest toward the red will be correctly identified, even if the exact hue and saturation of that red is misreported by a drifting sensor.

To minimize or compensate for any remaining issues due to sensor drift, the exemplary system 104 may include provision for providing a calibration sheet or object 146 including one or more calibration targets for occasional, periodic, or on-demand recalibrating of the one or more sensing elements included in the sensor module 112, or set of sensing elements.

For example, at an appropriate time, a system operator provides the calibration sheet or object 146 at a calibration sheet input and directs the system to calibrate one or more sensor elements of the sensor module 112. The controller 118 directs or schedules the set of object delivery paths 114 to transport the calibration sheet or object from the calibration sheet input to the appropriate sensing element. When the calibration sheet or object 146 is delivered to the sensing element of the sensor module 112, the controller 118 may direct or orchestrate the appropriate calibration procedure. At the conclusion of the calibration procedure, the controller 118 may direct the set of object delivery paths 114 to remove the calibration object or sheet 146 from the field of view of the sensing element. For example, the controller 118 may direct the object delivery paths 114 to transport the calibration object or sheet 146 to the discard bin 128.

It is to be noted that, while the sensor module 112 of the exemplary system 104 is illustrated as being at a single location, in some embodiments sensing elements of the sensor module may be distributed throughout the system, as long as each sensing element can receive diagnostic objects from any of a plurality of object sources, and only one sensing element is used to sense any particular aspect of diagnostic objects.

The object delivery paths 114 may include any transportation mechanism appropriate to the system 104. The object delivery paths 114 may include means for redirecting or steering objects from, for example, an object source to an output, from an object source to the sensor module 112, or from one object source to another object source. Where the system 104 is a document processor, the object delivery paths 114 may include, for example, cylindrical nip drive rollers, spherical nip spin roller drives, air transport modules and/or conveyer belts.

Figure 2:
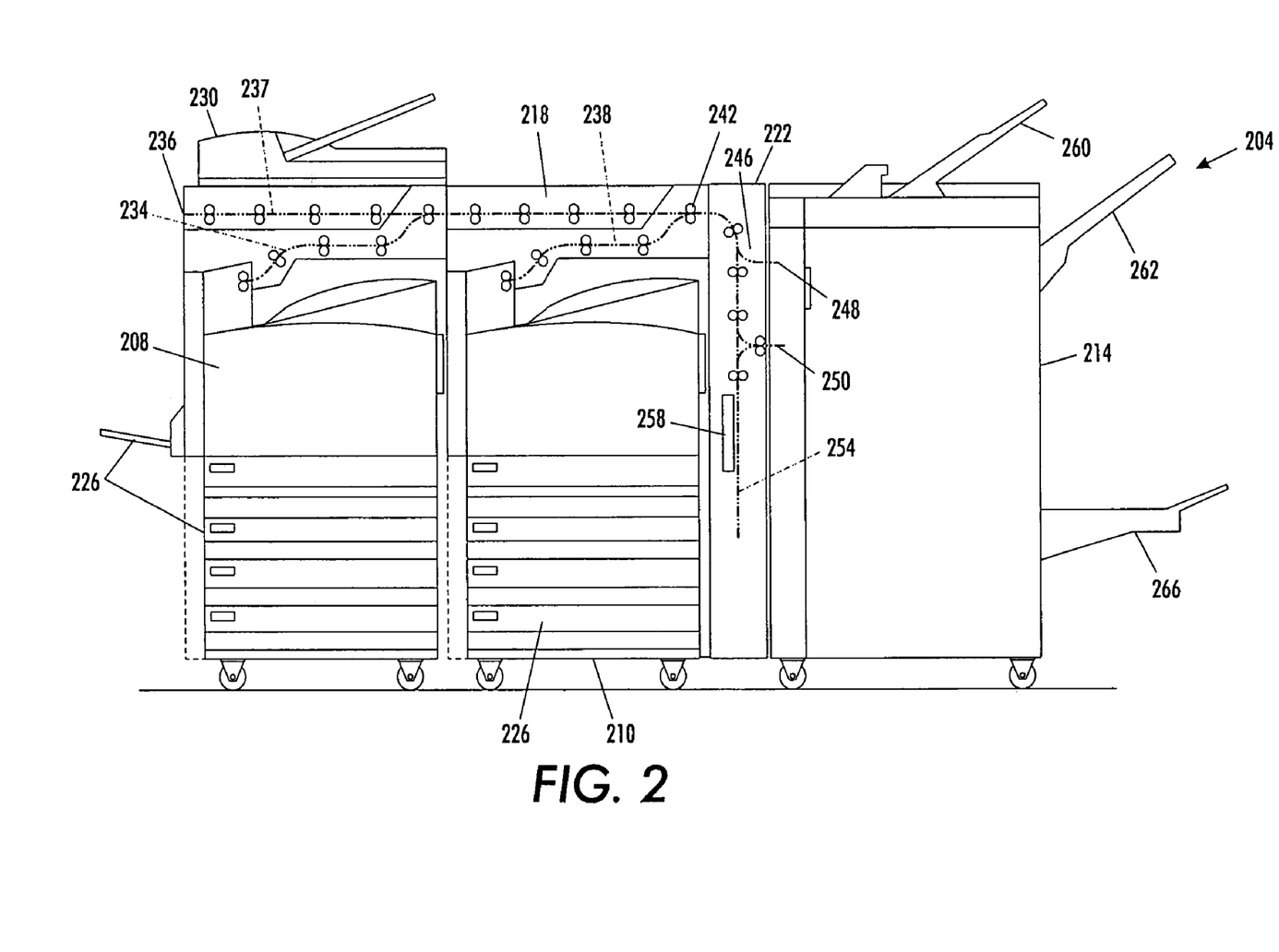
FIG. 2 is a diagram of a first document processor including a sensor module and a plurality of object delivery paths, each of the document delivery paths having access to an auxiliary path for the delivery of objects to a sensor module.

For example, referring to FIG. 2, a first document processing system 204 includes a first image output terminal (IOT) 208, a second image output terminal 210, a multi-function finishing device 214, a bypass transport module 218 and a finisher interface module 222. Each image output terminal 208, 210 includes a plurality of paper or input media trays 226 and an integrated marking engine (not shown). The first IOT 208 is associated with a scanner 230 and includes a first portion of a first output path 234, a calibration sheet input 236 and a calibration sheet input path 237. A second portion of the first output path is provided by the bypass module 218. The calibration sheet input path 237 merges with the second portion of the first output path 234 at the bypass module 218. The second IOT 210 includes a first portion 238 of a second path. A third portion of the first path and a second portion of the second path begin at a final nip 242 of the second IOT 210, extend through a top portion 246 of the final interface module and include a first input 248 and second input 250 to the multifunction finisher 214. An auxiliary path 254 is provided by a lower portion of the finisher interface module 222 and is accessible by both the third portion of the first path and the second portion of the second path at a point just below the second input 250 of the multifunction finisher 214. A sensor module 258 is mounted adjacent to the auxiliary path 254 and is able to examine, study and/or sense aspects of sheets delivered to and manipulated on the auxiliary path 254.

While the exemplary sensor module 258 is illustrated as a single box, zone or enclosure adjacent a single auxiliary path 254, it is to be understood that as used herein the phrase- sensor module- refers to any set of one or more sensing elements, wherein each sensing element of the set is accessible by output from a plurality of marking engines within a system and wherein any particular aspect of the output of the plurality of marking engines is sensed by only one of the sensing elements. As such, sensing elements may be co-located within a single zone or enclosure or distributed throughout a system adjacent one or more paths, and still be referred to herein as part of -a sensor module-.

The multifunction finisher 214 includes first 260 and second 262 main job output trays and a sample or purge tray 266. Depending on a document processing job description and on the capabilities of the multifunction finisher 214, one or both of the main job output trays 260, 262 may collect loose pages or sheets, stapled or otherwise bound booklets, shrink wrapped assemblies or otherwise finished documents. The multifunction finisher 214 receives sheets or pages from one or both of the image output terminals 208, 210 via one or both of the first and second inputs 248, 250 and processes the pages according to a job description associated with the pages or sheets and according to the capabilities of the multifunction finisher 214.

A controller (not shown) orchestrates the production of printed pages, their transportation over the various path elements (e.g., 234, 218, 238, 242, 246, 254) and their collation and assembly as job output by the multifunction finisher 214. On an occasional, periodic, or as needed or requested basis, the controller also orchestrates the generation and delivery of diagnostic pages from the image output terminals 208, 210 to the sensor module 258. The sensor module 258 senses the desired aspect of the diagnostic sheet, and reports this aspect information to the controller. The controller then orchestrates the transportation of the diagnostic sheet from the auxiliary path 254 to the sample or purge tray 266. For example, the controller directs or schedules motors and diverters to feed the diagnostic sheet (not shown) into the second input 250 of the multifunction finisher and controls the multifunction finisher 214 to deliver the diagnostic sheet to the sample or purge tray 266. The controller may then use aspect information received from the sensor module 258 to adjust one or more aspects of the production of pages or sheets in a subsequent document processing job or portion thereof.

When needed or desired, a calibration sheet may be provided at the calibration sheet input 236 and transported as directed by the controller (not shown) to the sensor module 258 (or a sensor element thereof) via the calibration sheet input path, the second portion of the first output path 234 and the auxiliary path 254. The controller (not shown) may then supervise a sensor module or sensor element calibration procedure. At the conclusion of the calibration procedure, the controller orchestrates the delivery of the calibration sheet to the sample or purge tray 266 in a manner similar to that described above with reference to diagnostic sheets. The calibration sheet input 236 may also be used to input preprinted forms as discussed in reference to FIG. 1.

Figure 3:
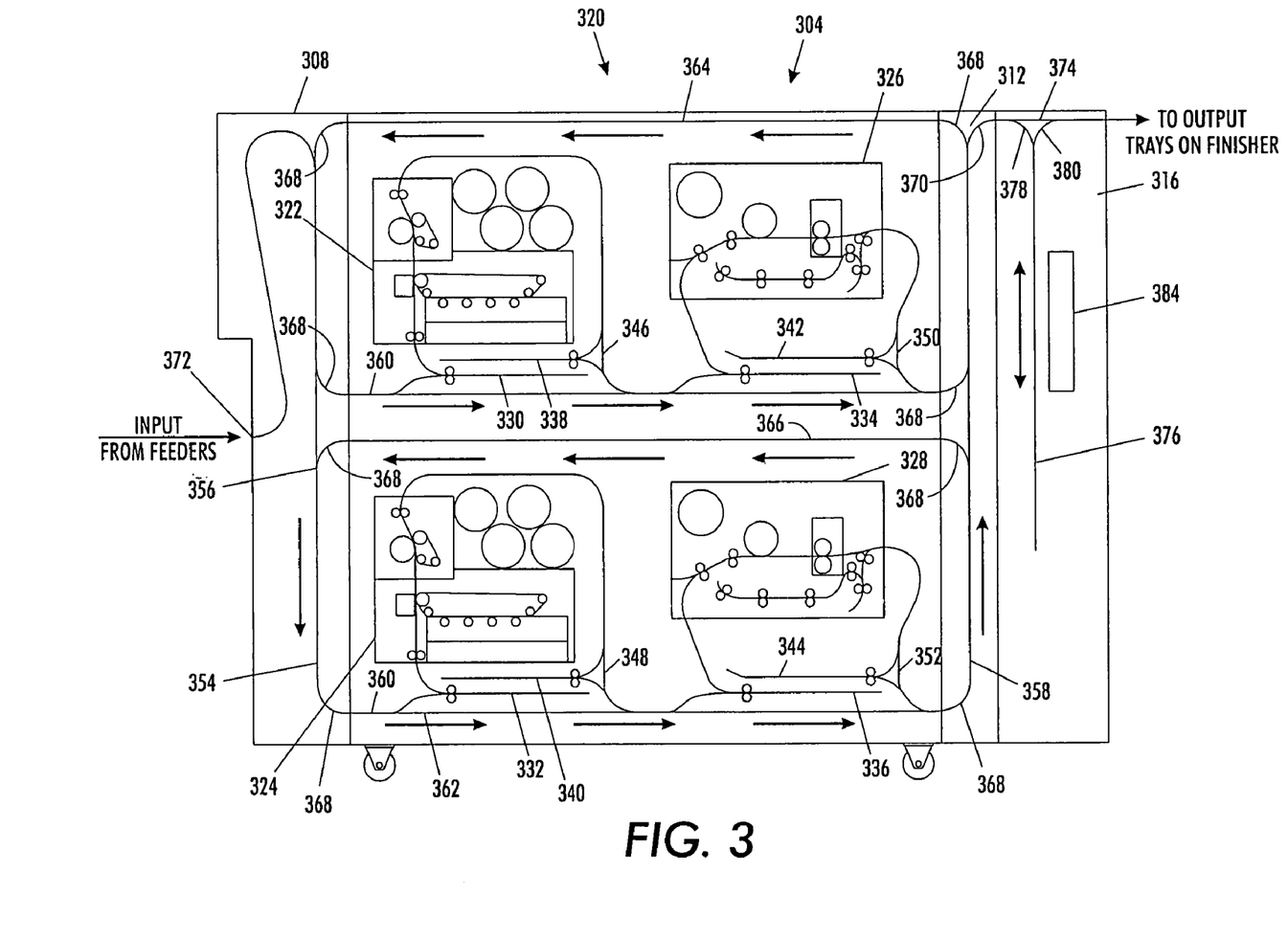
FIG. 3 is a diagram of a second document processor including a sensor module and plurality of document paths, each of the document delivery paths having access to an auxiliary path for delivering objects to a sensor module.

Referring to FIG. 3, a second document processor 304 includes a distributor 308, a collector 312, an output interface module 316 and a plurality 320 of integrated marking engines (IMEs) including a first 322, second 324, third 326 and fourth 328 integrated marking engine. For instance, the first and second 322, 324 IMEs are color integrated marking engines and the third and fourth, 326, 328 render images using only a single colorant (e.g., black). Each of the first, second, third and fourth IMEs 322, 324, 326, 328 include input inverters 330, 332, 334, 336 and output inverters 338, 340, 342, 344 respectively. The output inverters 338, 340, 342, 344 are associated with inverter bypasses 346, 348, 350, 352. An interposer 354 provides a plurality of overlapping object delivery paths for transporting objects (e.g., sheets or pages) from the distributor 308 to the IMEs 322, 324, 326, 328, the collector 312 and/or to the output interface module 316.

The interposer 354 includes a downward path 356, an upward path 358, first and second output bound paths 360, 362 and first and second return paths 364, 366. Interconnects 368 link the output bound and return paths 360, 362, 364, 366 with the downward 356 and upward 358 paths and, thereby, with each other. Therefore, the interposer 354 provides paths for transporting objects (e.g., pages, sheets) from any IME to any other IME and from any IME to an output interconnect 370 for delivering the objects (e.g., sheets or pages) to the output interface module 316.

For example, a sheet received at an input 372 of the distributor 308 is transported to the downward path 356 of the interposer 354. From the downward path 356 the sheet may be delivered to either the first 360 or second 362 output bound paths. From there, the sheet or page may enter any of the IMEs 322, 324, 326, 328 through their respective input inverters 330, 332, 334, 336. Once processed by the selected IME 322, 324, 326, 328 the sheet or page is delivered back to the output bound path 360, 362 from which it was received.

In this exemplary embodiment, the sheet or page may be delivered back to the output bound path 360, 362 either directly, via the output inverter bypass 346, 348, 350, 352 or after being inverted by the respective output inverter 338, 340, 342, 344.

Once delivered to the output bound path 360, 362 the sheet or page can be delivered to an adjacent IME (e.g., 326, 328) or delivered to the upward path 358 portion of the interposer 354 to be transferred to a return path 364, 366 or to the output link 370 and output interface module 316. From the return paths 364, 366 the page or sheet can be transferred to the downward portion 356 of the interposer 354 and routed to the input of any of the IMEs 322, 324, 326, 328 from the output bound paths 360, 362 as described above.

The output interface module 316 includes an output path 374, an auxiliary path 376 and first and second output interface links 378, 380 interconnecting the auxiliary path 376 with the output path 374. Additionally, the output interface module includes a sensor module 384, or set of sensor elements, positioned adjacent to the auxiliary path. The interposer 354, the output link 370 and the first output interface link 378 provide a path from any of the IMEs 322, 324, 326, 328 to the auxiliary path 376 and thereby to the sensor module 384. For example, a first object delivery path includes the first outbound path 360, an upper portion of the upward path 358, the output link 370, the first output interface link 378 and the auxiliary path 376. The first output path can carry sheets or pages from the first or third IME 322, 326 to the sensor module 384. A second object delivery path includes, for example, at least a portion of the second output bound path 362, the upward path 358, the output link 370, the first output interface link 378 and the auxiliary path 376. The second output path can transport objects (e.g., sheets or pages) from the second and fourth IMEs 324, 328 to the sensor module 384.

In other embodiments, the sensor module 384, or sensor elements of the sensor module, may be positioned adjacent to some portion of the interposer 354. The interposer may transport an object from any portion of the interposer to any other portion of the interposer 354. Therefore, there exists a path from any of the IMEs or object sources 322, 324, 326, 328 to any portion of the interposer 354 adjacent to which the sensor module 384, or a sensor element thereof, might be positioned. However, positioning the sensor module, or sensor element, adjacent to an auxiliary path, outside the flow of main document processing job production, allows diagnostic sheets to be studied, analyzed, examined and/or sensed over an extended period of time without disrupting or slowing down main job production.

Since positioning the sensor module adjacent an auxiliary path (e.g., 376) allows diagnostic sheets to be examined, studied, analyzed and or sensed over a prolonged period of time, slower (high integration time) sensors may be included in the sensor module 384. Slower sensors are often less expensive than their high speed counterparts. Additionally, positioning the sensor module 384 adjacent to an auxiliary path provides time for taking repeated measurements which can be averaged or otherwise combined to compensate for variance in sensor readings.

Wherever the sensor module 384 is placed, a controller (e.g., see FIG. 4) schedules the production of diagnostic prints and controls their delivery to, and examination by the sensor module 384. Information regarding sensed aspects of the diagnostic sheet is transferred from the sensor the controller. The controller may use the information regarding the sensed aspects to make adjustments to the rendering process of the IMEs (e.g., 322, 324, 326, 328).

For instance, the controller may make adjustments that cause the output of the first IME 322 to better match the output of the second IME 324.

Alternatively, the sensed aspect information may be used by the controller to adjust image path data to compensate for some aspect of a target IME. For instance, a tone reproduction curve may be generated or altered and applied to image path data in order to compensate for a drift in an IME selected for producing an image associated with the adjusted data.

Additionally, or alternatively, a warping may be applied to compensate for a skew or other mis-registration sensed in a diagnostic image or sheet.

Information regarding a sensed aspect of a diagnostic image may also be used to adjust a production schedule. For example, the controller may elect to have a particular portion of a document processing job rendered on the second IME 324 because a color gamut of the second IME 324 better accommodates the portion of the document processing job than does a color gamut of the first IME 322.

Additionally, or alternatively, the controller may elect to use two or more IMEs to render a page if no single IME is capable of producing the required colors of an image, but rendering the image is within the combined capabilities of the plurality of IMEs.

Alternatively, the controller may determine that variation between the IMEs is currently too large. Therefore, the controller may schedule opposing pages of a booklet to be rendered on the same IME, thereby reducing likelihood that differences between the IMEs will be noticed.

Figure 4:
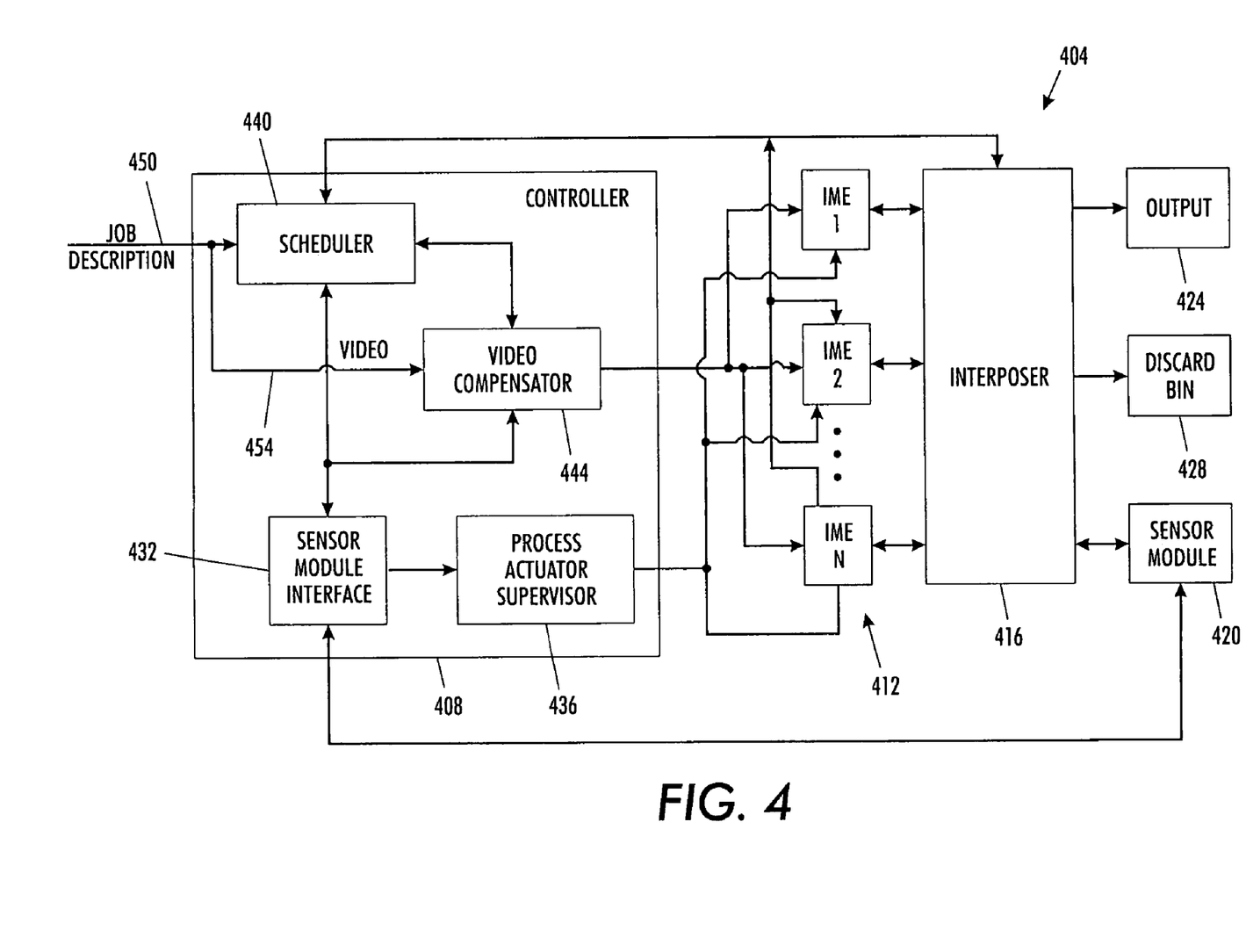
FIG. 4 is a block diagram of a document processor including a plurality of integrated marking engines and a sensor wherein sheets or documents produced or presented by any of the plurality of integrated marking engines may be delivered and sensed, examined or studied through the use of a sensor module.

For example, referring to FIG. 4, a third document processing system 404 includes a controller 408, a plurality 412 of integrated marking engines, an interposer 416 and a sensor module 420. The exemplary system also includes an output device 424 and a discard bin 428.

The controller 408 includes a sensor interface module 432, a process actuator supervisor 436, a scheduler 440 and a video compensator 444.

The sensor module interface 432 communicates with the sensor module 420. The sensor module interface 432 sends commands to the sensor module 420 directing the sensor module 420 to take appropriate measurements. Additionally, the sensor module interface 432 receives sensor measurement information or information regarding aspects of sensed or analyzed diagnostic sheets from the sensor module 420. The sensor module interface 432 distributes the received diagnostic sheet aspect information to appropriate components of the controller 408. For instance, information regarding aspects of a diagnostic sheet that can be controlled or adjusted by process actuators is delivered by the sensor module interface 432 to the process actuator supervisor 436. For instance, where the sensor module 420 includes a gloss sensor, gloss information regarding a diagnostic sheet is received by the sensor module interface 432 from the sensor module 420 and transferred or delivered to the process actuator supervisor 436. Where appropriate, the process actuator supervisor may direct a control loop in an IME associated with the diagnostic page to change a set point or other parameter associated with the gloss of pages. For instance, the process actuator supervisor 436 may direct control loops of an IME to change a fuser temperature.

Information related to aspects of a diagnostic page that can be adjusted or compensated for by adjusting video or image data is transferred by the sensor module interface 432 to the video compensator 444. For instance, information related to streaking in a diagnostic sheet examined by the sensor module 420 is transferred from the sensor module interface 432 to the video compensator 444. The video compensator 444 may then adjust or alter image data bound for the IME associated with the diagnostic sheet to compensate for the tendency of that particular IME to produce streaked images.

Diagnostic sheet aspect information that might have bearing on the selection of an IME for rendering a job or portion of a job is delivered by the sensor module interface 432 to the scheduler 440. For example, where the sensor module 420 includes a color sensor, color gamut information regarding a diagnostic page received by the sensor module interface 432 from the sensor module 420 may be delivered to the scheduler 440. The scheduler 440 may use the gamut information when scheduling the production of a job or portion of a job. For instance, portions of a job calling for a particularly vibrant shade of blue may be directed by the scheduler for production on an IME that produced a diagnostic sheet indicating a capability to produce the required shade of blue. Additionally, or alternatively, where gamut or registration information received from the sensor module 420 through the sensor module interface 432 indicates that each of the IMEs in the plurality 412 of IMEs are performing slightly differently, the scheduler 440 may schedule opposing pages in a book or booklet document processing job to be rendered on the same IME.

In operation, the controller 408 receives job description information 450. A video 454 or image portion of the job description information is distributed to the video compensator 444. The job description information 450 can be a main document processing job description or a diagnostic sheet production job description. Alternatively, the scheduler 440 or other portion of the controller 408 may store and schedule predefined diagnostic sheet production jobs. When the job description 450 is received, the scheduler 440 negotiates with components of the document processor 440 for the production of various job components.

For example, for each portion of the job, the scheduler compares job requirements with production capabilities reported by the sensor module 420 based on the examination of one or more diagnostic sheets from each of the plurality 412 of IMEs. Based on this comparison, the scheduler selects a preferred IME for the production of the portion of the job under consideration. The scheduler determines if the preferred IME is available to produce the job portion. If the preferred IME is available then the scheduler directs the video compensator to transmit video or image data associated with the job portion to the preferred IME at an appropriate time. The video compensator 444 may pass the video or image data 454 to the IME without changing, adjusting or altering it. However, if diagnostic sheet aspect information associated with the preferred IME indicates that image warping or compensating tone reproduction curves should be applied to compensate for registration errors, streaking or other rendering anomalies that can be compensated for in the video path, then the video compensator 444 applies the appropriate compensation to the video or image data before transferring or delivering it to the preferred or selected IME. Additionally, or alternatively, the video compensator may apply a tone reproduction curve to image or video data 454 described in a first color space in order to transform it into an appropriate IME dependent color space. For instance, video or image data 454 presented in a device independent color format may be transformed into color descriptions for the preferred IME based on calibration information determined through an examination of one or more diagnostic pages generated by the preferred IME and examined by the sensor module 420. This IME calibration aspect of the diagnostic sheet is recorded in the form of a tone reproduction curve (TRC) and used by the video compensator 444 to prepare video or image data 454 for rendering on the selected IME.

If the preferred IME is not available, scheduler 440 may select an alternate IME. In that case, the scheduler 440 would direct the video compensator 444 to prepare or compensate the video or image data 454 as appropriate for the alternate selection. The video compensator 444 would apply a calibration tone reproduction curve and/or image warping as appropriate based on diagnostic sheet aspect information received from the sensor module 420 in regard to one or more diagnostic sheets associated with the alternate IME.

The scheduler 440 also schedules and orchestrates the operation of the interposer 416 for delivering the produced portion of the job from the selected IME to an appropriate output device (e.g., 424). Additionally, or alternatively, the scheduler 440 may direct the interposer 416 to transfer a sheet from a first IME to a second IME for further processing. For instance, based on information received from the sensor module 420, the scheduler 440 may determine that no single IME of the plurality 412 of IMEs is capable of producing all the colors required in a portion of a print job but that the combined gamuts of 2 or more IMEs of the plurality 412 of IMEs do include all the required colors. Therefore, the scheduler 440 directs the interposer 414 to transfer output from the first IME to a second IME and the video compensator 444 is directed to transfer appropriate portions of the video or image data 454 to the first and second IME. Of course, the video compensator 444 applies a tone reproduction curve and image warping appropriate to the first IME to data transferred to the first IME and a tone reproduction curve and image warping appropriate to the second IME to data transferred to the second IME.

The job description 450 can include user preferences. For example, a user may indicate that a job or a portion thereof be rendered on a particular IME. Alternatively, a user may indicate that the job be rendered on the IME having a largest gamut or an IME capable of producing the highest gloss. Such user preferences are processed as additional constraints in the scheduling process. Since the interposer 416 provides the sensor module 420 with access to output from all of the IMEs of the plurality 412 of IMEs, the scheduler 440 has access to information for ranking the capabilities of the IMEs 412, which allows the scheduler 440 to comply with such user preferences or requests.

When the job description 450 includes a diagnostic sheet print job or when the controller 408 itself internally generates a diagnostic sheet production request, the scheduler 440 negotiates with a selected IME for a time slot for producing the diagnostic sheet. Additionally, the scheduler 440 negotiates with the interposer 416 for a time slot for delivering the diagnostic sheet from the selected IME to the sensor module 420. Furthermore, the scheduler 440 may negotiate with the sensor module 420 through the services of the sensor module interface 432 for a time slot for analyzing, studying, sampling and/or sensing aspects of the diagnostic sheet. Diagnostic sheet video or image data (e.g., 454) is delivered to the video compensator 444. Depending on the purpose and type of diagnostic sheet to be produced, the video compensator 444 may or may not alter the diagnostic sheet image data. For instance, if the purpose of the diagnostic sheet is to determine uncompensated aspects of the selected IME, then the video compensator 444 transmits the diagnostic image to the selected IME unaltered. If the purpose of the diagnostic session is to determine an effectiveness of compensations then the video compensator 444 applies compensations such as warping, calibration TRCs and streak compensation to the diagnostic image data before transferring it to the selected IME.

When the selected IME receives the diagnostic image data, the selected IME renders the diagnostic image and delivers it to the interposer 416. Based on directions from the scheduler 440, the interposer 416 may deliver the diagnostic sheet directly to the sensor module 420 for analysis. Alternatively, if, for example, the purpose of the diagnostic sheet is to determine a registration quality between two or more of the plurality of IMEs, the interposer 416 is directed by the scheduler 440 to deliver the diagnostic sheet to a second IME and the second IME is directed to place additional marks on the diagnostic sheet. Of course, appropriate diagnostic image data is transferred from the video compensator 444 to the second IME to indicate which marks are to be placed by the second IME on the diagnostic sheet.

Additional IMEs may be scheduled or directed to place marks on the diagnostic sheet and the interposer 416 and video compensator would be scheduled or directed to deliver the sheet and image data to the additional IMEs. When production of the diagnostic sheet is complete the interposer 416 delivers the diagnostic sheet to the sensor module 420. The sensor module 420 senses, examines or records aspects of the diagnostic sheet and delivers information regarding the sensed aspects to the sensor module interface 432. For example, depending on the sensors installed in the sensor module 420, the sensor module 420 may deliver information regarding intra IME registration, inter IME registration, color gamut, color or shading calibration, toner density, banding, streaking, and gloss. Of course, this list of diagnostic sheet aspects is exemplary only. Other aspects of diagnostic sheets may also be sensed.

As mentioned above in reference to FIG. 1 and FIG. 2, the sensor module 420 or elements of the sensor module may be calibrated on an as needed or as desired basis. For example, a calibration job description is received and a calibration image (e.g., 146) is delivered to the sensor module 420 or an element thereof by a system operator, the interposer 416 or some combination thereof. The calibration job description includes instructions for sensing and storing aspects of the calibration image.

When the analysis of the diagnostic sheet is complete, the interposer may transport the diagnostic sheet away from the sensor module 420. For example, the interposer may deliver the diagnostic sheet to the discard bin 428.

Figure 5:
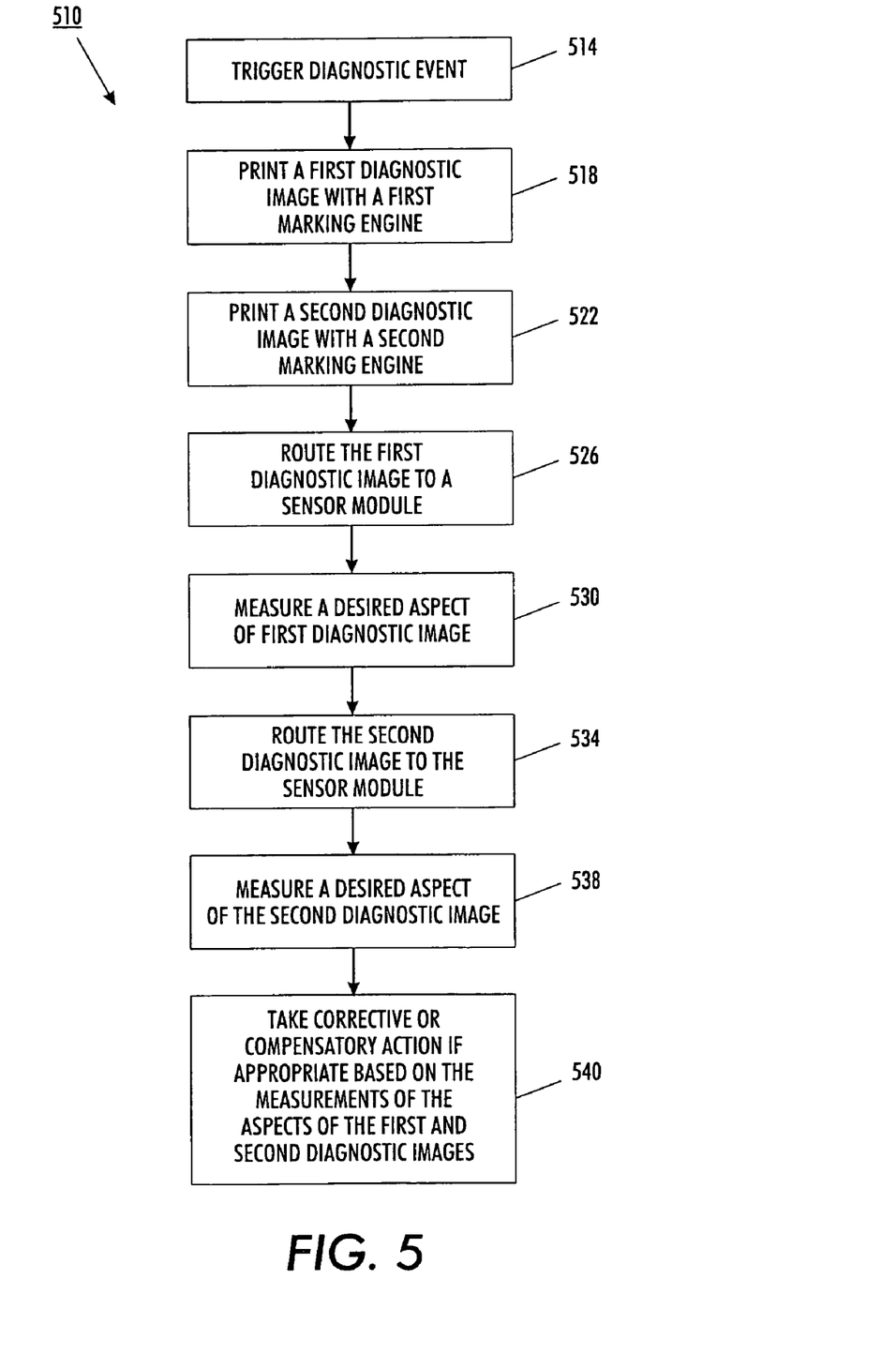
FIG. 5 is a flow chart outlining a method for controlling consistency in a multiple marking engine system.

Referring to FIG. 5, a method 510 for controlling consistency in a multiple marking engine system includes triggering 514 a diagnostic event, printing 518 a first diagnostic image with a first marking engine, printing 522 a second diagnostic image with a second marking engine, routing 526 the first diagnostic image to a sensor module (e.g., 112, 258, 348, 420) measuring 530 a desired aspect of the first diagnostic image, routing 534 the second diagnostic image to the sensor module (e.g., 112, 258, 348, 420) measuring 538 the desired aspect of the second diagnostic image and taking 540 corrective or compensatory action, if appropriate, based on the measurements of the desired aspects of the first and second diagnostic images.

Diagnostic events may be triggered 514 on the basis of any aspect of production appropriate to controlling or compensating for a desired aspect of image quality. However, it is anticipated that many of the aspects of image quality for which embodiments (e.g., 104, 204, 304, 404, 510) will be implemented to compensate or correct for will be static or semi-static in nature. That is, many of the aspects of image quality or consistency addressed by embodiments of the method 510 and systems (e.g., 104, 204, 304, 404) will change only slowly, with changes being detectable only over periods of many minutes, hours, days or months. Some aspects will change due to marking engine wear. Some aspects will vary based on ambient or machine temperature and/or humidity. Thermal expansion and contraction, charge retention, toner age and ability to de-agglomerate, ink viscosity, developer and nip wear and laser or light source efficiency are just a few aspects of document processing systems that affect image quality or consistency and which change slowly over time or with the number of images printed or rendered.

Default triggering events may be selected or configured by system designers. Additionally, or alternatively, embodiments may provide for document processing system operators to configure appropriate diagnostic event triggering 514 events. For instance, a first kind of diagnostic event may be triggered whenever a document processor is powered up or started. Additionally, or alternatively, a diagnostic event may be triggered 514 on a regular basis, such as, every 20 minutes or whenever some predetermined number of sheets or images are printed or rendered. Still other diagnostic events may be triggered 514 on the basis of temperature or humidity changes.

In some instances, image rendering aspects are best compensated for over several iterations. Therefore, one diagnostic event may serve as a trigger 514 for another diagnostic event. For instance, a first diagnostic image may indicate that streaking is occurring in a first marking engine. The streaking is sensed or measured 530, 538 and corrective image processing actions may be taken 540. However, for reasons of stability, it may be prudent to apply only an attenuated amount of corrective image processing. Therefore, the corrective action may trigger 514 a new diagnostic image to be rendered and examined so that a new measurement 530, 538 may be taken to determine if additional image processing is required. Additional iterations may be triggered as required or as a matter of course. Of course, diagnostic events may be triggered 514 at the request or direction of a system operator.

Printing 518 a first diagnostic image can include printing any image appropriate to the triggered 514 diagnostic event. For instance, if the triggered 514 diagnostic event is related to the collection of information regarding a color gamut of one or more integrated marking engines or image output terminals (e.g., 322, 324, 326, 328, 208), then printing 518 the first diagnostic image may include printing a plurality of color patches, such as those presented in the ANSI (American National Standards Institute) standard colorimetric target IT8.7/2-1993 or some other image best suited to determining color gamut information for the marking engine and sensor system in question.

If the triggered 514 diagnostic event is for gathering image uniformity information, such as information related to streaking, banding and mottling, printing 518 the first diagnostic print may include directing that one or more uniform mid-tone strips be printed across a page.

If the triggered 514 diagnostic event is related to collecting information regarding image size, such as, for example, information related to distortion due to, for example, shrinkage, printing 518 the first diagnostic sheet may include printing fiducial marks.

Fiducial marks may also be printed 518 on the first diagnostic sheet when the purpose of the triggered 514 diagnostic event is related to collecting information regarding image registration. Additionally, or alternatively, image registration investigations may be facilitated by printing 518 a first diagnostic image including one or more chevron patterns.

If the triggered 514 diagnostic event is related to gathering information with regard to aspects of image appearance such as, for example, gloss, printing 518 the first diagnostic image may include printing one or more color patches or color sweeps.

Printing 522 the second diagnostic image with the second marking engine may include printing a second diagnostic image that is similar to the first diagnostic image. For example, where an aspect of performance of the first marking engine is to be compared with a similar aspect of performance of the second marking engine, then printing 522 the second diagnostic image would likely include printing a similar image to the first diagnostic image. However, it is contemplated that the first diagnostic image and the second diagnostic image may be of different types. For instance, it may be appropriate to collect information regarding the various aspects of IME performance on a staggered or pseudo-random basis. Additionally, if the first and second IMEs are of different types (e.g., color and black and white or xerographic and ink jet), then it may be appropriate to use different diagnostic prints even when studying similar aspects.

Printing 522, the second diagnostic image can include printing 522 the second diagnostic image on the same sheet as the first diagnostic image or printing 522 the second diagnostic image on a second sheet. For instance, where the first and second diagnostic images are being printed 518, 522 in order to study an inter-IME registration it is appropriate for the first and second IMEs (e.g., 322, 324, 326, 328, 208, 210) to place fiducial marks on the same sheet. Additionally, where aspects of image size or image appearance are to be studied, it may be appropriate for both the first and second IMEs to process the same sheet. For instance, shrinkage and gloss may be dependent on the number of fusings and fuser temperature a sheet is exposed to. Therefore, when a print job calls for two or more marking engines to process a single sheet, it is appropriate to study a single diagnostic sheet that is also processed by two or more marking engines. Studies of the combined color gamut of a plurality of marking engines may also benefit from first and second diagnostic images being printed on the same sheet.

An interposer (e.g., 114, 354, 416) or set of path elements (e.g., 218, 234, 238, 242, 246, 254) can be used to route a sheet bearing a first diagnostic image printed 518 by a first marking engine (e.g., 208, 210, 322, 324, 326, 328) or object source (e.g., 132, 134, 136) to a second marking engine (e.g., 210, 208, 324, 326, 328, 322) or second object source (e.g., 134, 136, 132) so that the second marking engine or object source may print 522 the second diagnostic image on the sheet. Of course, in systems that include additional marking engines, these transport mechanisms may be used to deliver the diagnostic sheet to the additional marking engines so that additional diagnostic images may be applied to the diagnostic sheet.

The interposers or transport mechanisms (e.g., 114, 354, 416, 218, 234, 238, 242, 246, 254) can also be used to route 526, 534 the first and second diagnostic images to the sensor module (112, 258, 384, 420) or to a plurality of sensor elements. Of course, if both the first diagnostic image and the second diagnostic image are included on a single sheet, then routing 526 the first diagnostic image and routing 534 the second diagnostic image to the sensor module (or appropriate sensor module element) includes transporting only a single sheet from the second IME (or last IME in a series of IMEs to process or alter the diagnostic sheet) to the sensor module. Alternatively, where the first diagnostic image and second diagnostic image are rendered on separate sheets their rendering and routing are scheduled appropriately and the diagnostic images are routed to the sensor module (or appropriate sensing element) in an appropriate sequence.

Measuring 530 a desired aspect of the first diagnostic image can include measuring any aspect of the first diagnostic image. For example, where the first diagnostic image is rendered 518, in whole or in part, for the purpose of gathering color gamut information, the sensor module, or sensor element, may include a colorimeter, spectrophotometer and/or other means for generating and processing color information. For instance, on a regular or as needed basis a color sensor element of the sensor module is calibrated. A calibration sheet (e.g., ANSI IT8.7/2-1993) (e.g., 146) is routed to the sensor module (e.g., 112, 258, 384). The sensor module records sensor readings associated with measurements of color patches included in the image. The recorded readings may be stored in a memory associated with a sensor module or may be transmitted to a controller for storage in a recording device available to the controller. Subsequent measurements of first and second diagnostic images (assumed here to include versions of the ANSI IT8.7/2-1993 image) are compared with the stored calibration measurements and some measure of error or color difference is determined. For example, a Euclidian distance between a measured calibration color and an associated color from a diagnostic image may be determined. One class of such Euclidian distance measurements is referred to as $\Delta E$. $\Delta E$ may be determined between the calibration print and the first diagnostic image, thereby determining a $\Delta E$ for the first marking engine. $\Delta E$ can be for each color patch in a diagnostic image, a mean or average $\Delta E$ across a diagnostic image, a $\Delta E$ for each separation (C, M, Y or K), and/or for black patches in regard to a black and white or single colorant marking engine. $\Delta E$ can be measured between aspects of one marking engine and a standard or between two or more respective marking engines. Such color comparisons may be calculated by the sensor module or by a separate controller (e.g., 118, 408) based on measurement information received from the sensor module, or sensor element.

Where the first diagnostic image includes portions printed or rendered 518 for the purpose of collecting image uniformity information, the sensor module, or sensor elements, may include a sensor and/or processing means for determining image uniformity information. For instance, a color scan bar can be used to collect image uniformity information. Spatially dependent $\Delta E$ calculations may be made for various points within a rendered mid-tone strip of the first (or second) printed or rendered (518, 522) diagnostic image. $\Delta E$ variations in the process direction locate and quantify streaking. $\Delta E$ variations in the direction perpendicular to the process locate and quantify banding. Mottling may be identified and quantified by examining $\Delta E$ variations in both the process and cross process directions.

Where the diagnostic image is printed or rendered (518, 522) to include portions directed at gathering information regarding image size, the sensor module or plurality of sensing elements may include an image size sensor and/or processing elements adapted to determine image size information from the output of available sensors. For instance, a scan bar or other measurement device may be used to determine the location of fiducial marks included in the diagnostic image.

Where a diagnostic image is rendered or printed (e.g., 518, 522) to include portions for gathering image registration information, measuring (e.g., 530, 538) a desired aspect of the diagnostic image may include presenting the diagnostic image to a registration sensor. For instance, one or more chevrons included in the diagnostic image may be passed through the field of view of a bi-cell sensor. Timing information associated with the movement of portions of the chevrons through the field of view of portions of the bi-cell sensor can be processed to determine relative positions and orientations of and between portions of individual chevrons and two or more chevrons.

Where the diagnostic image is printed or rendered (518, 522) to include elements for determining gloss information, measuring 530, 538 a desired aspect of a diagnostic image can include using a gloss meter to examine at least a portion of the diagnostic image. For instance, a gloss meter includes a light source and a light sensor at a known or desired orientation. For instance, gloss meters having light sources and associated photo detectors oriented at 20°, 45°, 60°, 75° and 85° to the plane of a sheet being examined are available.

As indicated above, measuring 538 the desired aspect of the second diagnostic image may be accomplished by any appropriate means, including means similar to those described with reference to measuring 530 the desired aspect of the first diagnostic image. Measurements regarding the desired aspect of the second diagnostic image can be used to determine appropriate or compensatory action regarding the second marking engine or may be used to determine comparative performance information regarding the first and second marking engines. For example, in a system including four marking engines, such as, for example, two black and white marking engines and two color marking engines (e.g., K1, K2, C1, C2 respectively) any two of the marking engines may be considered the first marking engine and the second marking engine and comparative information can be determined between them. For instance, where it is desired to compare color gamuts between the two black and white marking engines, a $\Delta E$ (K1-K2) may be determined. Additionally, other $\Delta E$s may be determined, including, but not limited to, $\Delta E$ (K1-C1), $\Delta E$ (K1-C2), $\Delta E$ (K2-C1), $\Delta E$ (K2-C2) and $\Delta E$ (C1-C2).

Of course the method 510 can be extended to include printing third, fourth and more diagnostic images, routing them to the sensor module or appropriate sensing element, measuring desired aspects of the third, fourth or more diagnostic images and taking corrective or compensatory actions.

For example, with regard to color gamut investigations, $\Delta E$s or color gamut variations between three, four or more marking engines may be determined. For instance, using the nomenclature described above, $\Delta E$s such as $\Delta E$ (K1-K2-C1), $\Delta E$ (K1-K2-C2), $\Delta E$ (K1-C1-C2), $\Delta E$ (K2-C1-C2) and $\Delta E$ (K1-K2-C1-C2) may be determined.

Similarly, desired aspect measurements 538 of the second (or additional) diagnostic image regarding image uniformity, image size, image registration, image appearance and other aspects of object production can be used to compare the performance of an individual marking engine to some ideal or standard, for taking corrective or compensatory action (e.g., 540), and/or for collecting comparative or performance ranking information between the marking engines.

Taking 540 corrective or compensatory action can include adjusting system actuators or set points, adjusting job description data to compensate for system performance or scheduling job production in a manner that insures consistency or some other desired production goal.

For example, with regard to color gamut, taking 540 corrective or compensatory action may include taking actions to minimize $\Delta E$ for each separation in a particular marking engine and/or developing constraints for a planner/scheduler to be used in conjunction with default or customer or system operator preferences. For instance, attempts to minimize $\Delta E$ for each separation in a marking engine may include adjusting aspects of an imager such as laser or LED power. Additionally, or alternatively, a development voltage associated with each separation may be adjusted. Production job video or image data may be manipulated to compensate for performance aspects of a particular rendering device. For example, one or more compensating tone reproduction curves may be applied to production job image data in order to adjust the production job image data to a current calibration or performance of a target marking engine, or the marking engine which is scheduled to produce the image in question.

Additionally, or alternatively, taking corrections or compensatory action can include using measured 530, 538 aspect information to develop constraints for a planner/scheduler. To maximize throughput images are scheduled to be rendered on a next available marking engine. However, where customer or user preferences or demands require particular levels of quality or consistency, the planner/scheduler may compare these requirements to measured (e.g., 530, 538) levels of performance and schedule critical jobs or critical portions of jobs for production only on those marking engines in the system that can meet or exceed the indicated requirements, or that are the best available marking engines. For example, the marking engines may be ranked according to levels of performance in some aspect of images, such as, for example, mean of absolute $\Delta E$, spatial variation of absolute $\Delta E$, mean of $\Delta E$ of each separation, spatial variation of $\Delta E$ of each separation, as well as other aspects of performance. For instance, if a customer requests that a black and white production job be rendered so that each portion of the job is rendered with a $\Delta E$ of less than 1.5 from ideal, then the planner/scheduler may determine which available marking engines in the system are currently performing with a $\Delta E$ for a black separation (K) of less than 1.5 and schedule production of the job on only those marking engines. In an example where absolute accuracy is less important than consistency, a customer may specify that portions of a color job print be rendered with a relative $\Delta E$ of less than 4.0. In this case, the planner/scheduler may determine which groupings of available marking engines are currently operating within a $\Delta E$ of 4.0 and of those groupings which grouping includes the largest number of marking engines or which grouping would render the job the fastest or the most efficiently. The specified portions would be scheduled for production on those engines. Where no grouping of engines meets the specification, the specified portions would be scheduled for production on a single marking engine. For example, the specified portions might be facing pages in a document.

With regard to image uniformity, taking 540 corrective or compensatory action may include taking actions to minimize $\Delta E$ variations throughout an image and/or developing constraints for a planner/scheduler to be used in conjunction with customer or system operator preferences or requirements. For example, the drive or power level of a photonic imager, such as, for example, an array of LEDs may be varied in a spatially dependent manner in order to compensate for ΔE variations in a process direction. For instance, LEDs associated with light streaks may be driven less intensely while LEDs associated with dark streaks may be driven at a reduced power. Alternatively, spatially dependent tone reproduction curves may be applied to darken or lighten image or video data to compensate for spatial variations in the output response of a target marking engine.

Additionally, or alternatively, the planner/scheduler may respond to customer or system operator preferences or constraints by directing that job production be produced only with marking engines that meet or exceed those requirements. For instance, a customer may require that a job be printed only on printers capable of a ΔE across a page of less than 4.0. In that case the planner/scheduler may direct that job production be carried out only on marking engines currently operating within the indicated specification or on only those marking engines for which video or image data can be compensated so that job output is within a ΔE of 4.0.

Regarding image size, taking 540 corrective or compensatory action can include adjusting system actuators or applying image warping techniques so that images are rendered in their appropriate size. For example, a fuser temperature may be adjusted in order to increase or decrease a level of shrinkage. Additionally, or alternatively, an image description may be altered to scale or warp an image in order to compensate for the level of shrinkage currently occurring in a target rendering device or marking engine.

With regard to image registration taking 540 corrective or compensatory action may include adjusting process actuators, performing video path compensations and/or developing constraints for a planner/scheduler for use in combination with customer or system operator preferences or requirements.

For example, laser alignment or timing may be adjusted to correct or alter image registration. Additionally, or alternatively, job description information may be altered to shift the location of an image to compensate for misalignments within a target marking engine. Alternatively image registration information may be used to develop constraints for a planner/scheduler. For example, marking engines of a system may be ranked according to registration accuracy. Additionally, or alternatively, marking engines may be ranked or organized according to similarities in their current image registration. Customer preferences or requirements with regard to image registration are compared to the current registration performance of the available marking engines and job production is scheduled on only those marking engines that can render images within a specified absolute image registration accuracy or within a specified relative image registration accuracy.

With regard to image appearance aspects such as gloss, taking 540 corrective or compensatory actions can include adjusting system actuators, video or image data stream adjustment and/or developing constraints for a planner/scheduler. For example, gloss may be controlled by changing a fuser temperature within one or more marking engines. Additionally, or alternatively, various field strengths within a xerographic marking engine may be altered to change developed mass. Furthermore developed mass may be adjusted by altering half tone screen selections or thresholds within a selected half tone screen. Customer preferences or requirements with regard to image appearance aspects such as gloss are used in combination with measurements (e.g., 530, 538) and associated image appearance rankings to allow the scheduler/planner to select a best or acceptable combination of marking engines to yield prints with minimum appearance or gloss variations within pages, sheets or between opposing pages.

As indicated above, taking 540 corrective or compensatory action can be based on the desire for absolute accuracy or relative accuracy. In many instances relative accuracy and therefore consistency is sufficient to satisfy customer needs. Providing a single sensor for each aspect of image quality or consistency to be used to sense that aspect with regard to all the image or object sources in a system removes sensor variation as a source of consistency errors. While system embodiments have been described with reference to single sensor module including one or more sensors adjacent to a single auxiliary path, it is to be understood that some embodiments may include a plurality of sensor modules and/or a plurality of individual sensors adjacent one or more auxiliary or main paths as long as any particular aspect of production is measured by the same sensor element independent of which marking engine or object source provides, renders or produces the image or object to be sensed.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for handling objects, the system comprising:
   a first object source operative to present objects;
   a second object source operative to present objects;
   a first object delivery path operative to transport objects presented by the first object source to a first destination;
   a second object delivery path operative to transport objects presented by the second object source to a second destination, wherein the first and second destinations may be a single destination, separate destinations or interchangeable destinations;
   a sensor module operative to sense at least one aspect of a delivered object, the at least one sensor module being accessible from the first object delivery path and the second object delivery path; and,
   a controller that is operative to direct the first and second object delivery paths to participate in a delivery of respective objects from the first and second object sources to the sensor module, to receive information from the sensor module regarding the sensed at least one aspect of objects delivered to the sensor module and thereby, monitor and if appropriate, adjust or compensate for at least one aspect of the first and second object sources and to direct a removal of delivered objects from the sensor module.

2. The system of claim 1 wherein the at least one sensor module is accessible from the first and second object delivery paths via an auxiliary path.

3. The system of claim 1 further comprising:
   at least one additional object source operative to present objects;
   at least one additional object delivery path operative to transport objects presented by the at least one additional object source to at least one additional destination, wherein the first, second and the at least one additional destinations may be a single destination, separate destinations or interchangeable destinations;

wherein the sensor module is additionally accessible from the at least one additional object delivery path; and, the controller is additionally operative to monitor and if appropriate, adjust at least one aspect of the first, second and the at least one additional object sources.

4. The system of claim 1 wherein at least one of the first object source and the second object source comprises an integrated marking engine.

5. The system of claim 1 wherein the first object source comprises:

a xerographic print engine.

6. The system of claim 1 wherein the first object delivery path comprises at least one of a conveyor belt, cylindrical nip drive rollers, spherical nip spin roller drives and an air transport module.

7. The system of claim 1 wherein the at least one sensor module comprises at least one of a registration sensor, a color sensor, a colorimeter, a spectrophotometer, a toner densitometer, a streaking sensor, a banding sensor, a mottle sensor, a scan bar, a bi-cell registration sensor, and a gloss sensor.

8. A document processor comprising:

a first sheet source;

a second sheet source;

a sensor element operative to sense at least one aspect of a diagnostic sheet;

an interposer operative carry sheets from the first sheet source and the second sheet source to the sensor element;

a controller operative to direct at least one of the first sheet source and the second sheet source to deliver at least one diagnostic sheet to the interposer, to direct the interposer to deliver the at least one diagnostic sheet to the sensor element, to receive aspect information regarding the at least one diagnostic sheet from the sensor element and, if appropriate, adjust an aspect of at least one of the first sheet source, the second sheet source and a document processing job based on the received aspect information, and to direct a removal of delivered objects from the sensor module.

9. The document processor of claim 8 wherein the controller is operative to adjust the document processing job by contracting a gamut of at least a portion of the document processing job to remain within an intersection of a gamut of the first sheet source and a gamut of the second sheet source based on first sheet source and the second sheet source gamut information received from the sensor element, thereby improving document processor output consistency while allowing portions of the document processing job to be produced with both the first and second sheet sources.

10. The document processor of claim 8 wherein the controller is operative to adjust the document processing job by scheduling a selected portion of the document processing job for production on a selected one of the first sheet source and the second sheet source based on a content of the selected portion of the document processing job and an aspect of performance of the first and second sheet sources determined from information provided by the sensor element regarding the at least one aspect of the diagnostic sheet.

11. The document processor of claim 8 wherein the controller is operative to adjust the document processing job by adjusting a mapping of color descriptions associated with the at least a portion of the document processing job to related machine dependent color descriptions associated with at least a selected one of the first sheet source and the second sheet source based on information related to the machine dependent color descriptions for at least the selected one of the first sheet source and the second sheet source received from the sensor element, thereby applying a compensating calibration to at least the portion of the document processing job, for production on at least the selected one of the first sheet source and the second sheet source.

12. The document processor of claim 8 wherein the first sheet source comprises a first xerographic integrated marking engine and the controller is operative to adjust at least one xerographic process actuator of the first xerographic integrated marking engine based on an aspect of performance of the first xerographic integrated marking engine in comparison to an aspect of performance of the second sheet source based on information received from the at least one sensor element regarding the at least one aspect of the diagnostic sheet.

13. The document processor of claim 8 wherein the controller is operative to adjust the document processing job by scheduling a first selected portion of a sheet of the document processing job for production on a selected one of the first sheet source and a second selected portion of the sheet of the document processing job on the second sheet source based on content of the first and second selected portions of the document processing job and aspects of performance of the first and second sheet sources determined from information provided by the at least one sensor element based regarding the at least one aspect of the diagnostic sheet.

14. The document processor of claim 8 wherein the controller is operative to receive preference indications from a document processor operator and adjust an aspect of at least one of the first sheet source, the second sheet source and the document processing job based on the received aspect information from the at least one sensor element and the received preference indications.

15. The document processor of claim 14 wherein the controller is operative to adjust the document processing job by scheduling a selected portion of the document processing job for production on a selected one of the first sheet source and the second sheet source based on the received preference information and an aspect of performance of the first and second sheet sources determined from information received from the at least one sensor element regarding the at least one aspect of the diagnostic sheet.

16. The document processor of claim 8 wherein the controller is operative to adjust the document processing job by scheduling a first portion of a first page of the document processing job and a first portion of a second page of the document processing job, the second page to be oriented facing the first page in a final document assembly, for production on a selected one of the first sheet source and the second sheet source based on an aspect of performance of the first and second sheet sources determined from information received from the sensor element regarding the at least one aspect of the diagnostic sheet, thereby ensuring that the first portion of the first page and the first portion of the second page have a consistent appearance in the final document assembly.

17. The document processor of claim 8 further comprising:

a calibration sheet input; and a calibration sheet delivery path operative to carry a calibration sheet from the calibration sheet input to the sensor module, whereby the sensor element may sense one or more aspects of the calibration sheet and thereby collect calibration information regarding the sensor element.

18. A method for controlling consistency in a multiple marking engine system, the method comprising:

printing a first diagnostic image with a first marking engine;

printing a second diagnostic image with a second marking engine;

transporting the first diagnostic image to a sensor element with an interposer;

measuring a first aspect of the first diagnostic image with the sensor element;

transporting the first diagnostic image away from the sensor element with the interposer;

transporting the second diagnostic image to the sensor element with the interposer;

measuring a second aspect of the second diagnostic image;

transporting the second diagnostic image away from the sensor element with the interposer;

taking corrective or compensatory action, if appropriate, based on the measurements of the first and second aspects.

19. The method of claim 18 wherein taking corrective or compensatory action comprises:

adjusting a process actuator of at least one of the first and second marking engines.

20. The method of claim 18 wherein taking corrective or compensatory action comprises:

adjusting image path data to correct or compensate for at least one facet of at least one of the measured first and second aspects.

21. The method of claim 18 wherein taking corrective or compensatory action comprises:

generating a constraint to a scheduling process based on at least one of the measured first and second aspects.

22. The method of claim 21 wherein generating a constraint to the scheduling process comprises:

requiring that a first portion and a second portion of a document processing job both be rendered with a selected one of the first marking engine and the second marking engine if the first and second aspects are not measured to be within a predetermined aspect tolerance.

23. The method of claim 18 wherein printing the first diagnostic image with the first marking engine and printing the second diagnostic image with the second marking engine comprises printing the first diagnostic image on a diagnostic sheet and printing the second diagnostic image on the same diagnostic sheet.

* * * * *